US008812508B2

(12) United States Patent
Zhang et al.

(10) Patent No.: US 8,812,508 B2
(45) Date of Patent: Aug. 19, 2014

(54) SYSTEMS AND METHODS FOR EXTRACTING PHASES FROM TEXT

(75) Inventors: Li Zhang, Sunnyvale, CA (US); Yuhong Xiong, Mountain View, CA (US); Wei-Chun Wang, Beijing (CN)

(73) Assignee: Hewlett-Packard Development Company, L.P., Houston, TX (US)

(*) Notice: Subject to any disclaimer, the term of this patent is extended or adjusted under 35 U.S.C. 154(b) by 825 days.

(21) Appl. No.: 12/738,844

(22) PCT Filed: Dec. 14, 2007

(86) PCT No.: PCT/CN2007/071233
§ 371 (c)(1),
(2), (4) Date: Jul. 21, 2010

(87) PCT Pub. No.: WO2009/079875
PCT Pub. Date: Jul. 2, 2009

(65) Prior Publication Data
US 2010/0293159 A1 Nov. 18, 2010

(51) Int. Cl.
*G06F 7/00* (2006.01)
*G06F 17/30* (2006.01)
(52) U.S. Cl.
CPC .... *G06F 17/30985* (2013.01); *G06F 17/30702* (2013.01)
USPC ............ 707/741; 707/711; 707/728; 707/758
(58) Field of Classification Search
None
See application file for complete search history.

(56) References Cited

U.S. PATENT DOCUMENTS

| | | | | |
|---|---|---|---|---|
| 5,721,897 A * | 2/1998 | Rubinstein | ............................. | 1/1 |
| 5,819,260 A * | 10/1998 | Lu et al. | ........................ | 707/700 |
| 5,963,965 A * | 10/1999 | Vogel | ............................. | 715/236 |
| 6,338,057 B1 * | 1/2002 | Weeks | ........................... | 707/736 |
| 6,546,385 B1 * | 4/2003 | Mao et al. | ....................... | 707/711 |
| 6,721,728 B2 * | 4/2004 | McGreevy | ............................. | 1/1 |
| 7,016,896 B2 * | 3/2006 | Shibuya | ................................. | 1/1 |
| 7,487,169 B2 * | 2/2009 | Agarwal | ................................ | 1/1 |
| 7,620,538 B2 * | 11/2009 | Marcu et al. | ....................... | 704/2 |
| 7,620,627 B2 * | 11/2009 | Cava | ....................................... | 1/1 |
| 7,702,614 B1 * | 4/2010 | Shah et al. | ...................... | 707/741 |
| 7,925,655 B1 * | 4/2011 | Power et al. | ................... | 707/741 |
| 7,987,185 B1 * | 7/2011 | Mysen et al. | .................. | 707/733 |
| 8,010,501 B2 * | 8/2011 | Bourdoncle et al. | ........... | 707/673 |
| 8,090,723 B2 * | 1/2012 | Cao et al. | ....................... | 707/741 |

(Continued)

FOREIGN PATENT DOCUMENTS

JP 2007-140861 9/2007

OTHER PUBLICATIONS

A. V. Aho and M. J. Corasick, Efficient String Matching: An Aid to Bibliographic Search, Communications of the ACM; Jun. 1975.

(Continued)

*Primary Examiner* — Robert Beausoliel, Jr.
*Assistant Examiner* — Susan F Rayyan

(57) ABSTRACT

Systems and methods for extracting phrases from text are disclosed. In an exemplary embodiment, a method may include preprocessing desired phrases into at least one phrase indexing data structure for efficient matching. The method may also include scanning text to construct a hash table including keys and corresponding entries. The method may also include locating suffix trie trees for each word in the hash table. The method may also include matching each position in the hash table against the suffix trie trees, and outputting phrases matched in the scanned text.

21 Claims, 4 Drawing Sheets

(56) References Cited

U.S. PATENT DOCUMENTS

| | | | |
|---|---|---|---|
| 8,117,223 B2* | 2/2012 | Patterson | 707/759 |
| 8,126,890 B2* | 2/2012 | Bobick et al. | 707/736 |
| 8,271,403 B2* | 9/2012 | Rieck et al. | 706/12 |
| 2002/0042923 A1* | 4/2002 | Asmussen et al. | 725/92 |
| 2002/0052894 A1* | 5/2002 | Bourdoncle et al. | 707/513 |
| 2002/0099694 A1* | 7/2002 | Diamond et al. | 707/3 |
| 2002/0188599 A1* | 12/2002 | McGreevy | 707/3 |
| 2003/0078913 A1* | 4/2003 | McGreevy | 707/3 |
| 2003/0105622 A1* | 6/2003 | Horowitz et al. | 704/9 |
| 2006/0206306 A1* | 9/2006 | Cao et al. | 704/4 |
| 2007/0112764 A1* | 5/2007 | Yih et al. | 707/5 |
| 2007/0225968 A1* | 9/2007 | Murakami et al. | 704/9 |
| 2007/0255702 A1* | 11/2007 | Orme | 707/5 |
| 2008/0005151 A1* | 1/2008 | Iwakura | 707/102 |
| 2008/0086453 A1* | 4/2008 | Fabian | 707/3 |
| 2008/0120292 A1* | 5/2008 | Sundaresan et al. | 707/5 |
| 2008/0243820 A1* | 10/2008 | Chang et al. | 707/5 |
| 2008/0306949 A1* | 12/2008 | Hoernkvist et al. | 707/7 |
| 2009/0043757 A1* | 2/2009 | Corbitt et al. | 707/5 |
| 2009/0112848 A1* | 4/2009 | Kunjithapatham et al. | 707/5 |

OTHER PUBLICATIONS

M. Fisk and G. Varghese, Applying Fast String Matching to Intrusion Detection, (successor to Technical Report CS052001-0670, University of California, San Diego, 2001.).

* cited by examiner

SYSTEMS AND METHODS FOR EXTRACTING PHASES FROM TEXT

BACKGROUND

Although there are a large number of websites on the Internet or World Wide Web (www), users often are only interested in information on specific web pages from some websites. Given the sheer size of Internet, it has become increasingly important to tailor searches and product recommendations to the user's personal interests/preferences. It is burdensome for both the user and the entity seeking information to ask the user to specify his/her personal interests/preferences. In addition, those interests/preferences may change over time. It is therefore generally considered more convenient to automatically discover user interests/preferences from the web pages the user visits. To enable such a tool, information contained in web pages visited by the user needs to be identified and extracted.

This information may include extracting movie titles, entity names (e.g., sports teams), or other information from web or text documents. On the surface, the problem of matching movie titles (or other information) appears to be a string matching problem. But actually, it has special characteristics and the standard string matching algorithms do not work well.

There are several well-known algorithms for string matching. The Knuth-Pratt-Morris and Boyer-Moore algorithms match a single string pattern against an input string. The Aho-Corasick and Set-wise Boyer-Moore algorithms match multiple patterns. When applied to human language text, these algorithms usually work at character level. That is, the basic elements that form the patterns and the input text are considered to be characters. This means that the alphabet (the set of elements) is relatively small. In the case of English, there are twenty-six letters, plus a few other characters (e.g., space and apostrophe). Some of the algorithms take advantage of the small size of the English alphabet by pre-computing the actions for each element. For example, the Boyer-Moore algorithm pre-computes, for each element in the alphabet, the number of characters in the input text that can be skipped and stores these skip values in a table. However, these algorithms are limited to use with a specific language. In addition, a large number of comparisons are needed to effectively extract the desired information and therefore the algorithms are generally considered to be inefficient for these purposes.

DETAILED DESCRIPTION

Systems and methods for extracting multi-word patterns or "phrases" from a text (e.g., a web page or document) are disclosed. In exemplary embodiments, a database is constructed with the desired phrase, and in some embodiments, related phrases that often appear in the same text when the desired phrase is used. The systems and methods may then be implemented for matching phrases in the text.

Exemplary systems and methods are described herein with reference to the particular application of extracting movie titles from text. By knowing which movie the user is interested in, links can then be provided for the user to, e.g., rent the movie, read reviews, or discover similar movies. It is noted, however, that the systems and methods disclosed herein may also be implemented for a wide variety of other applications (e.g., for extracting from text song names, sports team names, companies, schools, government agencies, etc.).

The disclosed multi-word pattern matching approach is different from the standard string matching problem. Take the English language as an example. At the word level, it is well known that the frequency of words follows a Zipf distribution. Zipf's law states that, in a structured set of texts of natural language the frequency of any word is inversely proportional to its rank in frequency. Accordingly, the most frequent word occurs twice as often as the second most frequent word, which occurs twice as often as the fourth most frequent word, and so forth.

The systems and methods disclosed herein take advantage of this distribution by comparing each unique word (not each occurrence of a word) against the least frequent word in the phrase (e.g., a movie title). This approach greatly reduces the number of comparisons needed to identify the phrase in the text. In addition, when working at the word level, the set of elements in the patterns and text are all the possible words in one or more language. Accordingly, the systems and methods described herein can work with multiple languages at the same time.

In addition, text can be compared against a very large set of phrases. This large element set is handled by using hash tables to store the mapping from the words to data structures ($st(w)$, $pt(w)$ and hash table), making the comparison very efficient. This set-wise, multi-word matching problem also enables special characteristics (e.g., word frequency comparisons) that the string matching algorithms do not take advantage of.

Figure 1:
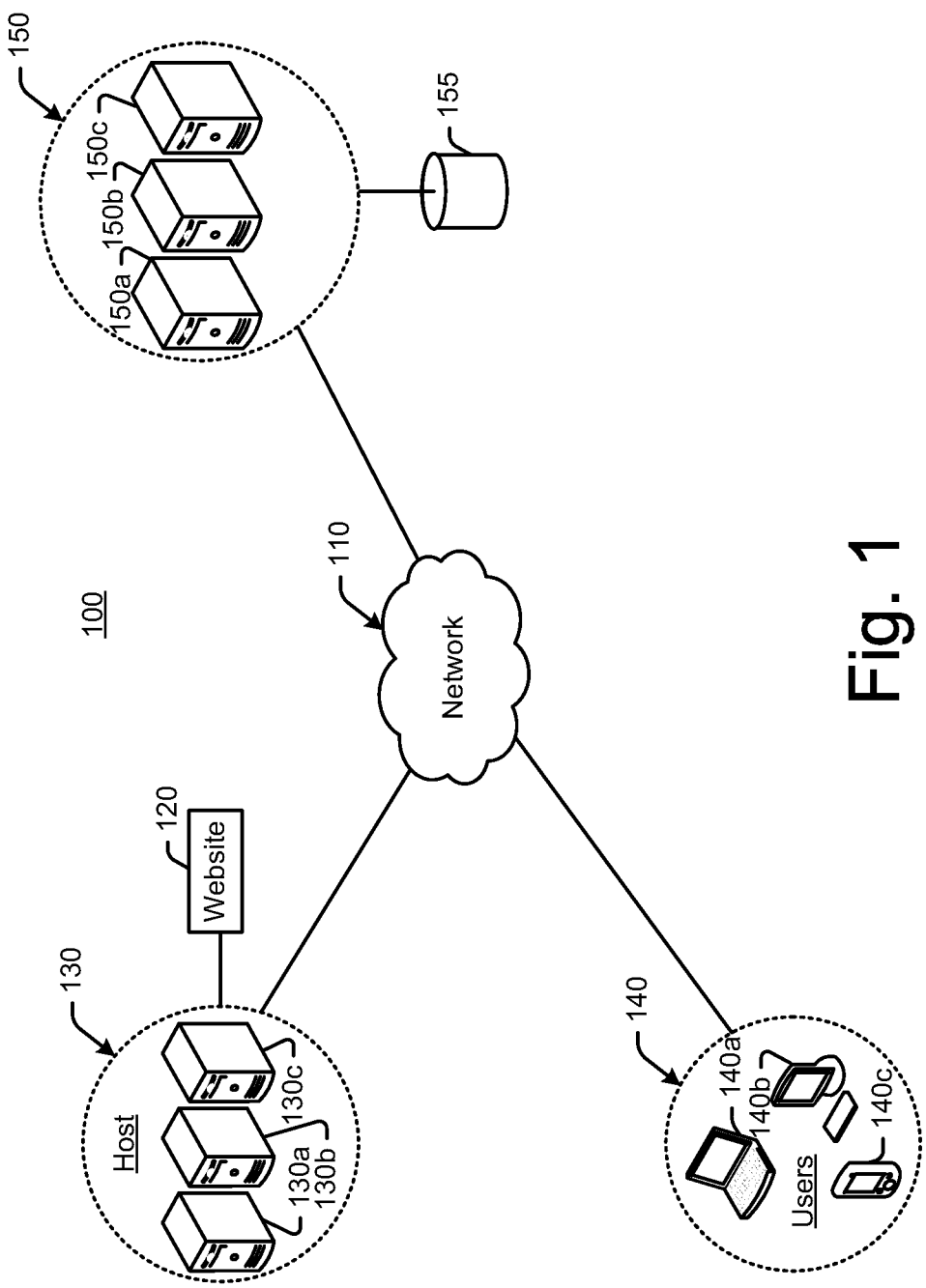
FIG. 1 is a high-level diagram of an exemplary networked computer system in which systems and methods for extracting phrases from text may be implemented.

FIG. 1 is a high-level illustration of an exemplary networked computer system 100 (e.g., via the Internet) in which systems and methods for extracting phrases from text may be implemented. The networked computer system 100 may include one or more communication networks 110, such as a local area network (LAN) and/or wide area network (WAN), for connecting one or more websites 120 at one or more host 130 (e.g., servers 130a-c) to one or more user 140 (e.g., client computers 140a-c).

The term "client" as used herein (e.g., client computers 140a-c) refers to one or more computing devices through which one or more users 140 may access the network 110. Clients may include any of a wide variety of computing systems, such as a stand-alone personal desktop or laptop computer (PC), workstation, personal digital assistant (PDA), or appliance, to name only a few examples. Each of the client computing devices may include memory, storage, and a degree of data processing capability at least sufficient to manage a connection to the network 110, either directly or indirectly. Client computing devices may connect to network 110 via a communication connection, such as a dial-up, cable, or DSL connection via an Internet service provider (ISP).

The operations described herein may be implemented by the host 130 (e.g., servers 130a-c which also host the website 120) or by a third party system 150 (e.g., servers 150a-c) in the networked computer system 100. In either case, the servers may execute program code which enables comparison of phrases in one or more documents (e.g., a web page in website 120). The results may then be used to assist the user 140.

The term "server" as used herein (e.g., servers 130*a-c* or servers 150*a-c*) refers to one or more computing systems with computer-readable storage. The server may be provided on the network 110 via a communication connection, such as a dial-up, cable, or DSL connection via an Internet service provider (ISP). The server may be accessed directly via the network 110, or via a network site. In an exemplary embodiment, the website 120 may also include a web portal on a third-party venue (e.g., a commercial Internet site) which facilitates a connection for one or more servers via a back-end link or other direct link. The servers may also provide services to other computing or data processing systems or devices. For example, the servers may also provide transaction processing services for users 140.

When the server is "hosting" the website 120, it is referred to herein as the host 130 regardless of whether the server is from the cluster of servers 130*a-c* or the cluster of servers 150*a-c*. Likewise, when the server is executing program code for extracting phrases from text, it is referred to herein as the server 150 regardless of whether the server is from the cluster of servers 130*a-c* or the cluster of servers 150*a-c*.

The program code may execute the exemplary operations described herein for extracting phrases from text. In exemplary embodiments, the operations may be embodied as logic instructions on one or more computer-readable medium. When executed on a processor, the logic instructions cause a general purpose computing device (e.g., server 150) to be programmed as a special-purpose machine that implements the described operations.

For purposes of illustration, the components and connections depicted in the figures may be used to extract movie titles from text (e.g., documents or web pages on the Internet 110), although the systems and methods are not limited to such an application. By knowing which movie the user is interested in, links can be provided for the user to conveniently rent the movie, to read reviews of the movie, discover similar movies, etc.

There are already fairly complete movie databases 155 available, such as the Internet Movie Database (IMDB). These databases typically contain the movie title, directors, and actors/actresses. Other information may also be provided by these databases 155. There are two major challenges in efficient and accurate extraction. First, there are a large number of movies. For example, the IMDB database contains more than 120,000 movies. It is very expensive to search for each movie title that may be contained in the text. Second, a movie title is often a meaningful word or phrase which needs to be distinguished from other words in the text. And when multiple movies have the same name, it needs to be determined which movie, if any at all, the title really corresponds to. Exemplary operations for enabling these features are described in more detail now with reference to FIGS. 2-4.

Figure 2:
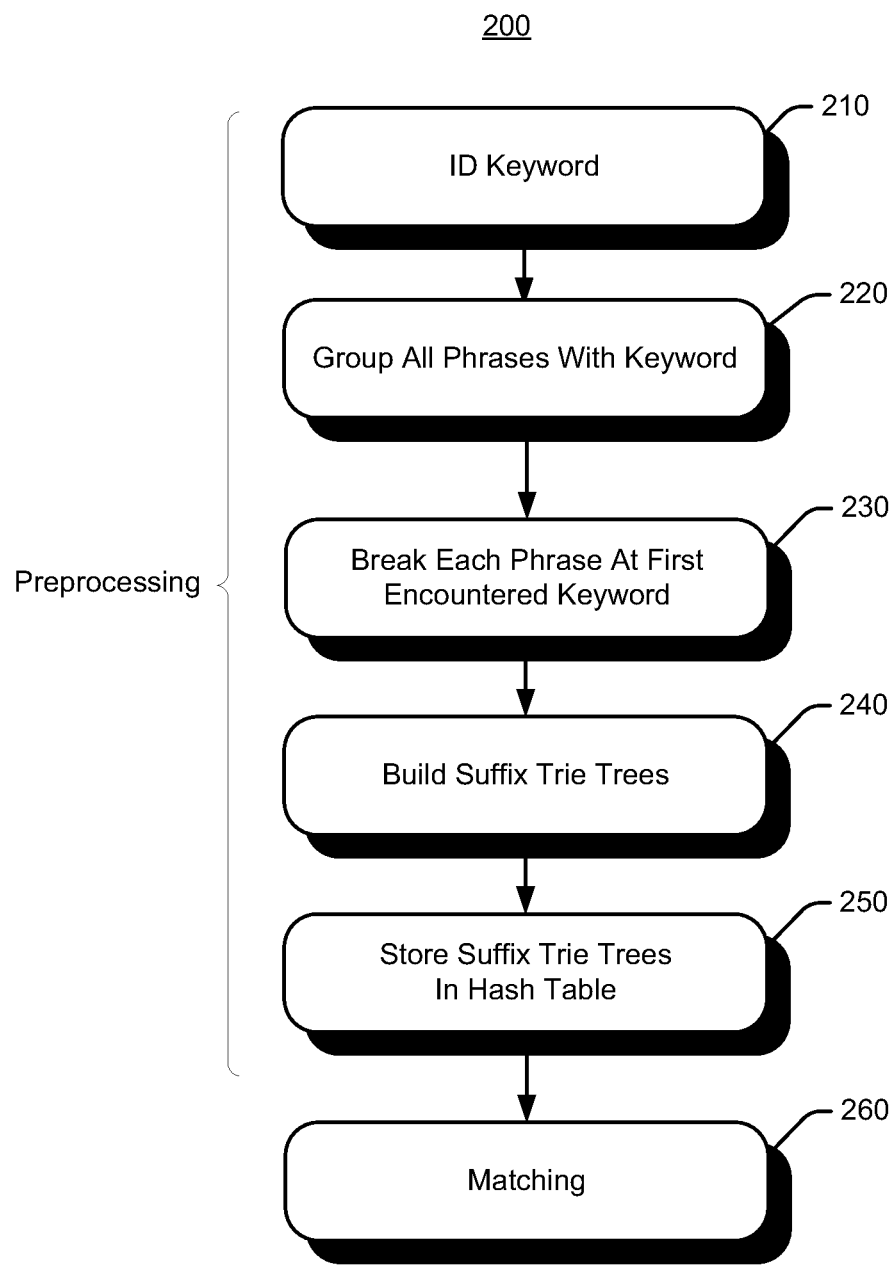
FIG. 2 is a flowchart illustrating exemplary operations for extracting phrases from text.
Figure 3:
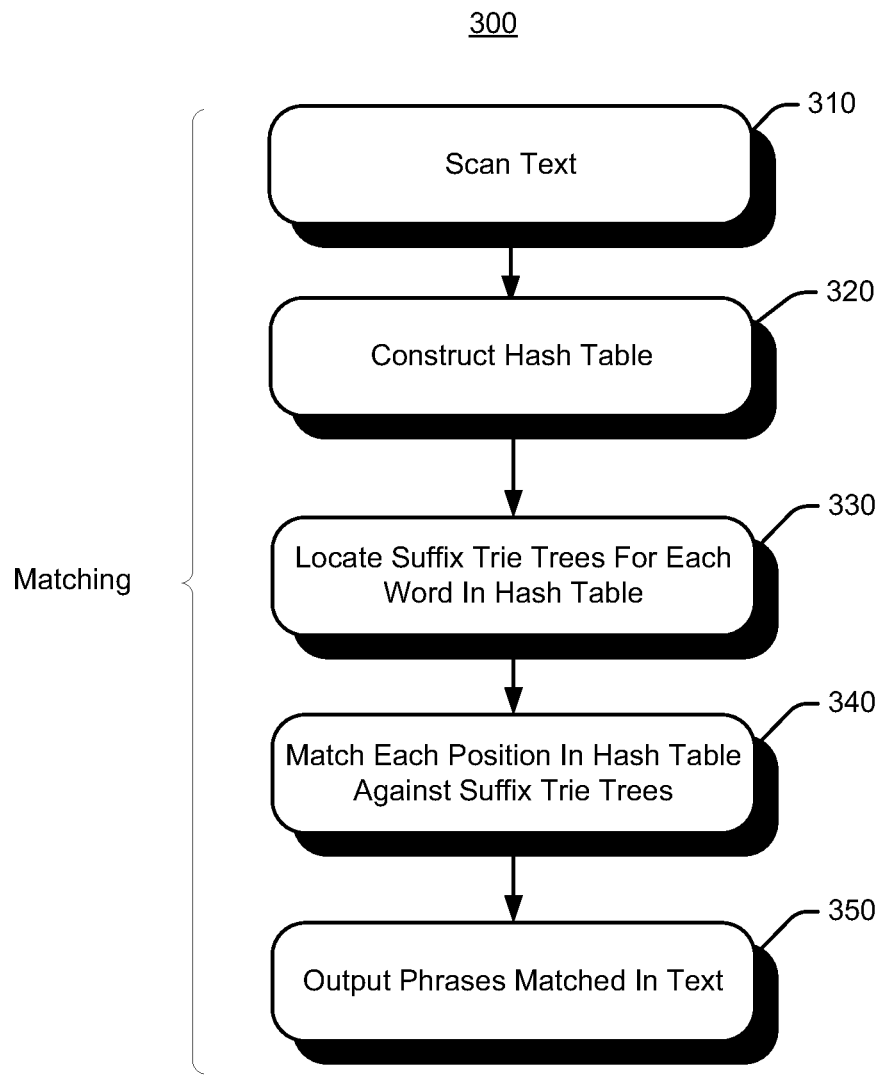
FIG. 3 is a flowchart illustrating exemplary matching operations in more detail.

FIG. 2 is a flowchart illustrating exemplary operations 200 for extracting phrases from text. First, the movie titles are preprocessed (operations 210-250) into one or more phrase indexing data structures for efficient matching. Then those phrase indexing data structures are used to expedite the matching process (FIG. 3). In operation 210, a keyword is identified for each movie title. In exemplary embodiments, the keyword is the word that appears least frequent in a typical text.

In operation 220, all of the phrases are grouped by keyword. For example, all the movie titles ($t\_1, t\_2, \ldots t\_k$) with the same keyword w are grouped. In operation 230, each phrase is broken at the first encountered keyword. For example, break each $t_i$ at the first encountered keyword w in $t\_i$, obtaining $p\_i$ and $s\_i$. That is, $t\_i = p\_i \bullet w \bullet s\_i$, where $\bullet$ indicates concatenation. In operation 240, suffix trie trees st(w) and pt(w) are built. For example, a suffix trie tree st(w) is built at the word level, on $s\_i$'s for i=1 to k. Then the order of words in $p\_i$ is reversed, obtaining $q\_i$, and a suffix trie tree pt(w) is built on $q\_i$'s for i=1 to k. In operation 250, the suffix trie trees st(w) and pt(w) are stored in the phrase indexing data structures and are indexed by keyword w. The phrase indexing data structures serve as an overall index of the document. In operation 260, matching may commence, as described in more detail with reference to FIG. 3.

FIG. 3 is a flowchart illustrating exemplary matching operations 300 in more detail. In operation 310, text is scanned (e.g., sequentially). In operation 320, a hash table is constructed in memory. The hash table includes keys (e.g., the words contained in the text) and entries (e.g., the list of positions of the words in the text). The hash table is used in operations 330 and 340.

In operation 330, the suffix trie trees st(w) and pt(w) in the phrase indexing data structures built in preprocessing are located for each word w in the hash table. In operation 340, each position in the hash table is matched against the suffix trie tree st(w) (wherein the matched set is referred to as L_1) and against the suffix trie tree pt(w) (wherein the matched set is referred to as L_2). An entry of the hash table records all the positions of a word's appearance in the document. By checking each position, the algorithm basically goes through the whole document. The specific manner in which the document is indexed is not important and any suitable process may be implemented. In operation 350, phrases matched in the text are output. Continuing the above example, the intersection between L_1 and L_2 is the set of titles matched in the document.

Other embodiments are also contemplated. For example, preprocessing may be modified to improve the accuracy of matches by reducing false positives. In an exemplary embodiment, director and actor/actress information contained in the movie databases may be utilized in the preprocessing as described in more detail with reference to FIG. 4.

Figure 4:
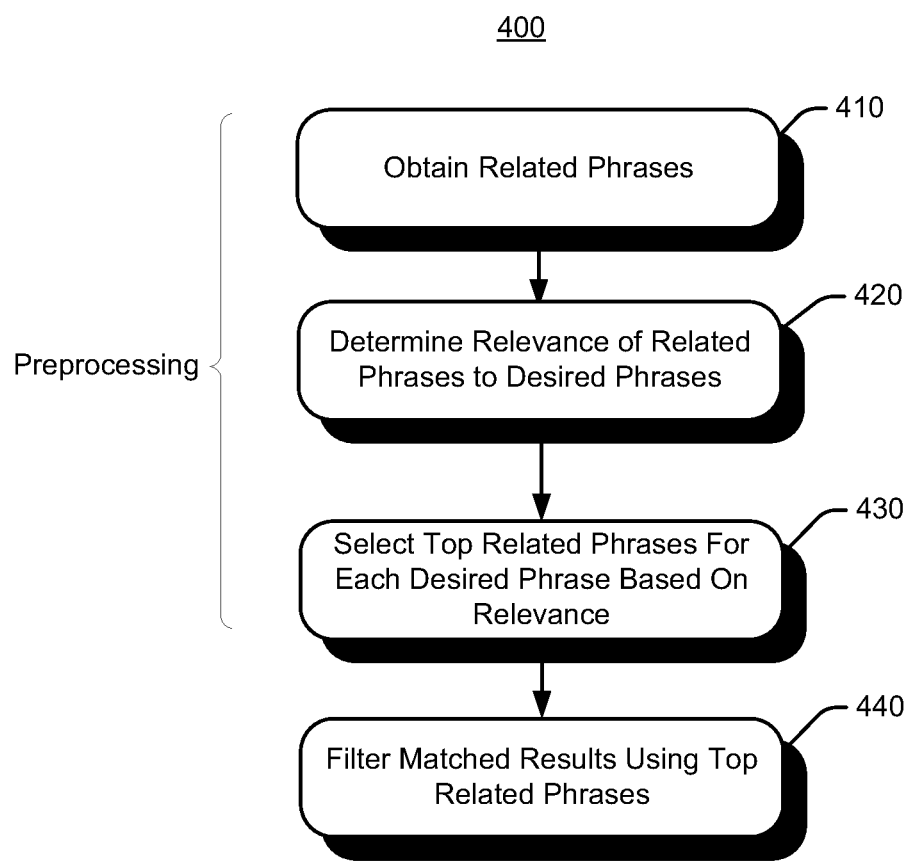
FIG. 4 is a flowchart illustrating additional exemplary pre-processing operations.

FIG. 4 is a flowchart illustrating additional exemplary preprocessing operations. The basic idea is that when searching for a movie title, director/actor/actress name associated with the movie may also be used. By finding more relevant names, there is a higher confidence that the title is a true match.

In operation 410, a list of related phrases is obtained from the database (e.g., associated people such as director/actor/actress for each movie). In operation 420, the relevance of the related phrases to the desired phrases is determined. For example, if the related phrases include persons, the relevance of each person is identified for each movie. In many cases, the relevance is already indicated in the movie database. When it is not, heuristics may be used to determine the relevance (e.g. the number of movies each person is associated to).

In operation 430, top related phrases are selected for each movie according to the relevance (e.g., x directors, y actors, and z actresses, where x, y, and z are some predefined constants such as x=1, and y=z=2). Either the top related phrases, or those meeting a predetermined threshold are selected In an exemplary embodiment, the last name is indexed by the movie title. When a title is matched in the text, the list of related phrases (e.g., names) is retrieved and searched in the text. The confidence is then given by the number of times each related phrase (e.g., names) appears in the document. For example, the billing position may be used to determine the top related phrase wherein the billing position correlates to the importance of each role in the IMDB database. If billing position is not available, a weighted sum of the number of movies and TV events each actor/actress appears in may be used. Still other methods may also be implemented. In operation 440, matched results may be filtered using the top related phrases, e.g., to reduce false positives. Other factors may also be used to help decide whether a particular phrase refers to a movie title. For example, in a web document the number of overlapping words between a movie title and the HTML title may be used. Or for example, the number of times a movie title appears in the text may be used. Each factor may be assigned a weight and combined using a heuristic formula.

It is understood that the embodiments shown and described herein are intended only for purposes of illustration of exemplary systems and methods and are not intended to be limiting. In addition, the operations and examples shown and described herein are provided to illustrate exemplary implementations for extracting phrases from text. It is noted that the operations are not limited to those shown. Other operations may also be implemented. Still other embodiments of for extracting phrases from text are also contemplated, as will be readily appreciated by those having ordinary skill in the art after becoming familiar with the teachings herein.

In addition to the specific embodiments explicitly set forth herein, other aspects and implementations will be apparent to those skilled in the art from consideration of the specification disclosed herein.

The invention claimed is:

1. A method for extracting phrases from text, comprising:
   preprocessing desired phrases into at least one phrase indexing data structure for efficient matching;
   during preprocessing building suffix trie trees, wherein one of the suffix trite trees is built at a word level, and then an order of words is reversed to build another one of the suffix tile trees;
   after preprocessing, scanning text to construct a hash table including keys and corresponding entries;
   locating suffix trie trees in the at least one phrase indexing data structure for each word in the hash table;
   matching each position in the hash table against the suffix trie trees; and
   outputting phrases matched in the scanned text.

2. The method of claim 1 wherein preprocessing further includes identifying a keyword for each of the desired phrases.

3. The method of claim 2 wherein the keyword is a word appearing least frequent in a typical text.

4. The method of claim 2 wherein preprocessing further includes grouping the desired phrases by keyword.

5. The method of claim 2 wherein preprocessing further includes breaking each phrase at a first encountered keyword.

6. The method of claim 1 wherein preprocessing further includes building the suffix trie trees and storing the suffix trie trees in the at least one phrase indexing data structure.

7. The method of claim 1 wherein preprocessing further comprises reducing false positives using related phrases.

8. The method of claim 7 further comprising determining relevance of the related phrases to the desired phrases.

9. The method of claim 1 further comprising selecting top related phrases for each desired phrase based on relevance.

10. The method of claim 1 further comprising during preprocessing:
    grouping all the desired phrases by keyword;
    breaking each phrase at a first encountered keyword obtaining p_i and s_i;
    building suffix trie trees st(w) and pt(w), wherein the suffix trie tree st(w) is built at a word level and then order of words in p_i is reversed to obtain q_i, wherein the suffix trie tree pt(w) is but on q_i;
    indexing the suffix trie trees st(w) and pt(w) by keyword.

11. The method of claim 1 wherein the at least one phrase indexing data structure is an overall index of a document.

12. A system for extracting phrases from text, comprising:
    at least one phrase indexing data structure residing in non-transitory computer readable media, the at least one phrase indexing data structure including desired phrases;
    program code stored on non-transitory computer readable media and executable by a processor for improving accuracy of matches in scanned text by reducing false positives using phrases related to the scanned text, the preprocessing program code building suffix trie trees, wherein one of the suffix trie trees is built at a word level, and then an order of words is reversed to build another one of the suffix trie trees;
    a hash table constructed in non-transitory computer readable media, the hash table including keys and corresponding entries; and
    program code stored on non-transitory computer readable media and executable by a processor for locating suffix trie trees for each word in the hash table and matching each position in the hash table against the suffix trie trees to match phrases in the scanned text.

13. The system of claim 12 wherein the keyword for each of the desired phrases is identified.

14. The system of claim 12 wherein the keyword is a word appearing least frequent in a typical text.

15. The system of claim 14 wherein the desired phrases are grouped by keyword.

16. The system of claim 14 wherein each phrase is broken at a first encountered keyword.

17. The system of claim 12 wherein the hash table includes keys and corresponding entries, the keys being words contained in the text and the corresponding entries being the list of positions of the words in the text.

18. The system of claim 12 wherein the program code executes a preprocessing operation to improve accuracy of matches by reducing false positives using related phrases.

19. The system of claim 12 wherein phrases extracted from text are movie titles, book titles, album names, or sport team names.

20. The system of claim 12 wherein a desired phrase is extracted from a large database.

21. A system for extracting movie titles from web-based text, comprising:
    memory means for storing at least one phrase indexing data structure including desired movie titles;
    preprocessing means for improving accuracy of matches of movie titles in the web-based text by reducing false positives using phrases related to the movie titles, the preprocessing means building suffix trie trees, wherein one of the suffix trie trees is built at a word level, and then an order of words is reversed to build another one of the suffix trie trees;
    table means for storing keys and corresponding entries, the keys representing words in the web-based text, and the entries representing a list of positions of the words in the web-based text; and
    means for locating suffix trie trees for each word in the table means and matching each position in the table means against the suffix trie trees to match movie titles in a scanned web-based text.

* * * * *